United States Patent
Park et al.

(10) Patent No.: US 10,349,371 B2
(45) Date of Patent: Jul. 9, 2019

(54) METHOD FOR PERFORMING POSITIONING IN WIRELESS COMMUNICATION SYSTEM, AND APPARATUS THEREFOR

(71) Applicant: LG ELECTRONICS INC., Seoul (KR)

(72) Inventors: Jonghyun Park, Seoul (KR); Bonghoe Kim, Seoul (KR); Kijun Kim, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/317,699

(22) PCT Filed: Jun. 22, 2015

(86) PCT No.: PCT/KR2015/006294
§ 371 (c)(1),
(2) Date: Dec. 9, 2016

(87) PCT Pub. No.: WO2015/199392
PCT Pub. Date: Dec. 30, 2015

(65) Prior Publication Data
US 2017/0111880 A1    Apr. 20, 2017

Related U.S. Application Data

(60) Provisional application No. 62/016,087, filed on Jun. 23, 2014.

(51) Int. Cl.
*H04W 64/00*    (2009.01)
*H04W 4/02*    (2018.01)

(52) U.S. Cl.
CPC ............. *H04W 64/00* (2013.01); *H04W 4/02* (2013.01)

(58) Field of Classification Search
CPC ................................. H04W 64/00; H04W 4/02
See application file for complete search history.

(56) References Cited

U.S. PATENT DOCUMENTS

| 2010/0273506 A1 | 10/2010 | Stern-Berkowitz et al. |
| 2012/0027110 A1* | 2/2012 | Han .................... H04J 11/0079 375/260 |
| 2012/0108270 A1* | 5/2012 | Kazmi .................. H04W 64/00 455/456.5 |

(Continued)

FOREIGN PATENT DOCUMENTS

WO    WO 2013/172588 A1    11/2013

*Primary Examiner* — Joseph E Dean, Jr.
(74) *Attorney, Agent, or Firm* — Birch, Stewart, Kolasch & Birch, LLP

(57) ABSTRACT

The present invention provides a method for performing positioning by a terminal in a wireless communication system including: receiving assistance data including reference cell information (ReferenceCellInfo) and neighboring cell information (NeighbourCellInfo) from a serving base station; receiving a positioning reference signal from each of a reference cell and at least one neighboring cell based on the received assistance data; measuring a reference signal time difference (RSTD) for the reference cell of at least one neighboring cell by using the received positioning reference signal; and reporting the measured RSTD to the serving base station.

9 Claims, 12 Drawing Sheets

(56) References Cited

U.S. PATENT DOCUMENTS

| | | |
|---|---|---|
| 2012/0122472 A1 | 5/2012 | Krishnamurthy et al. |
| 2012/0184290 A1 | 7/2012 | Kazmi et al. |
| 2013/0315195 A1 | 11/2013 | Ko et al. |
| 2014/0206341 A1* | 7/2014 | Siomina ............ H04W 36/0085 455/422.1 |
| 2015/0072708 A1 | 3/2015 | Lim et al. |

* cited by examiner

[Figure 1]
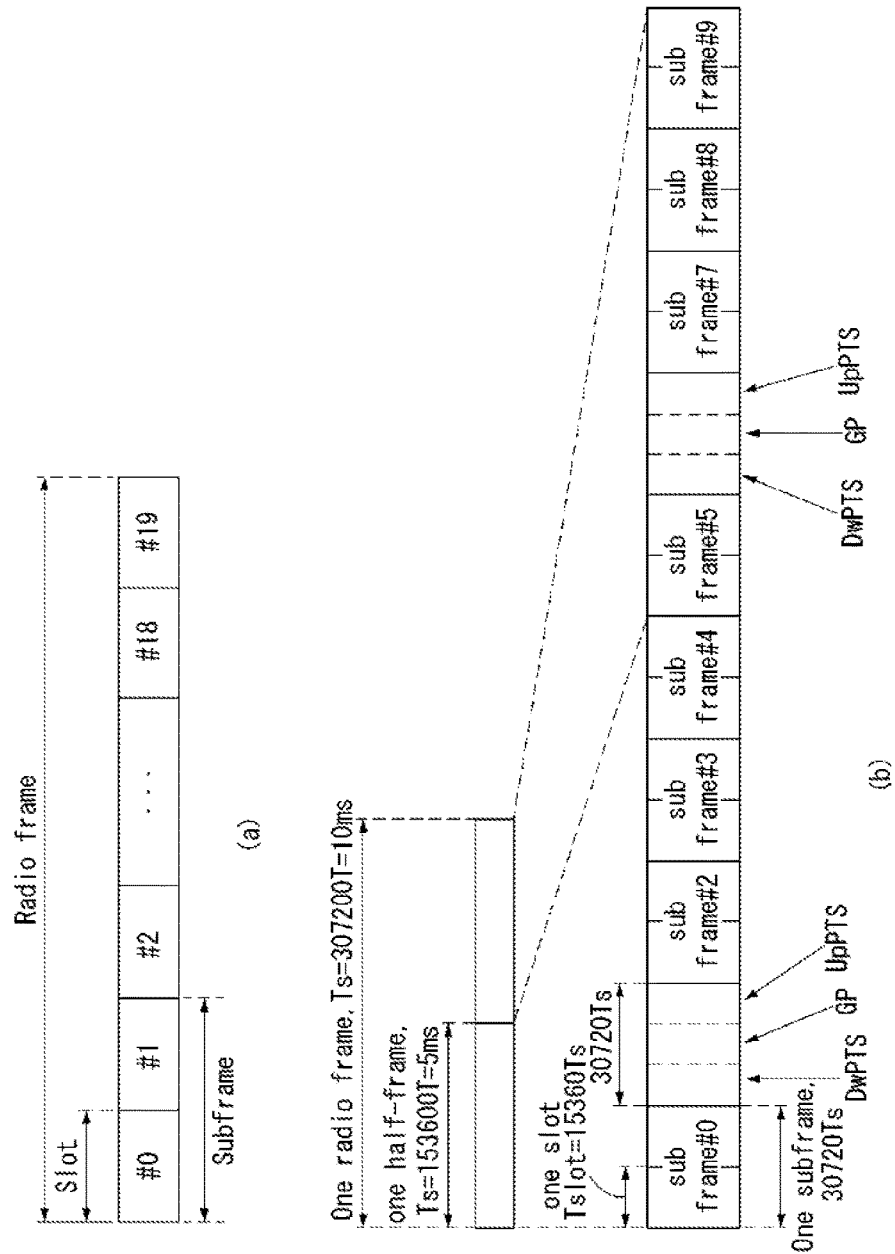

[Figure 2]
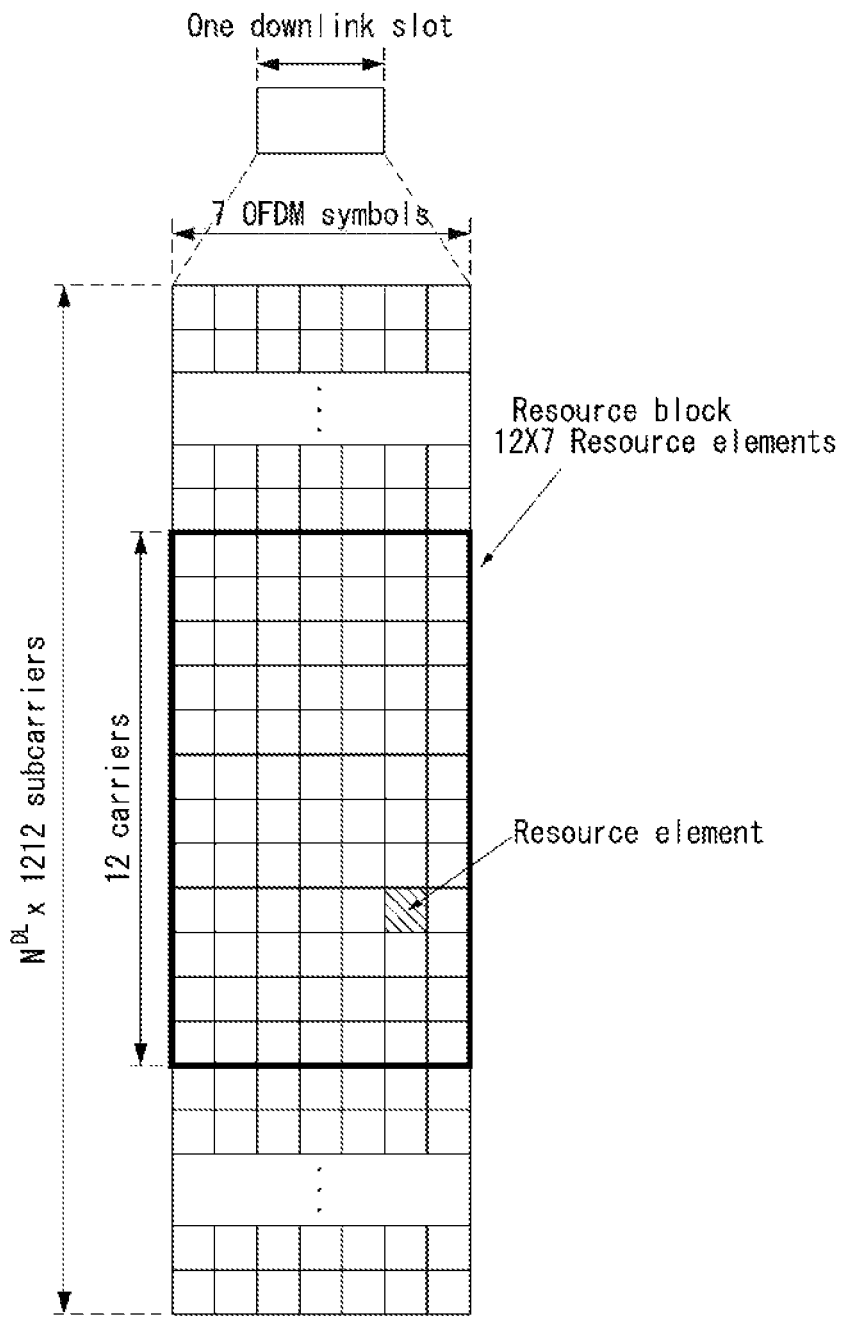

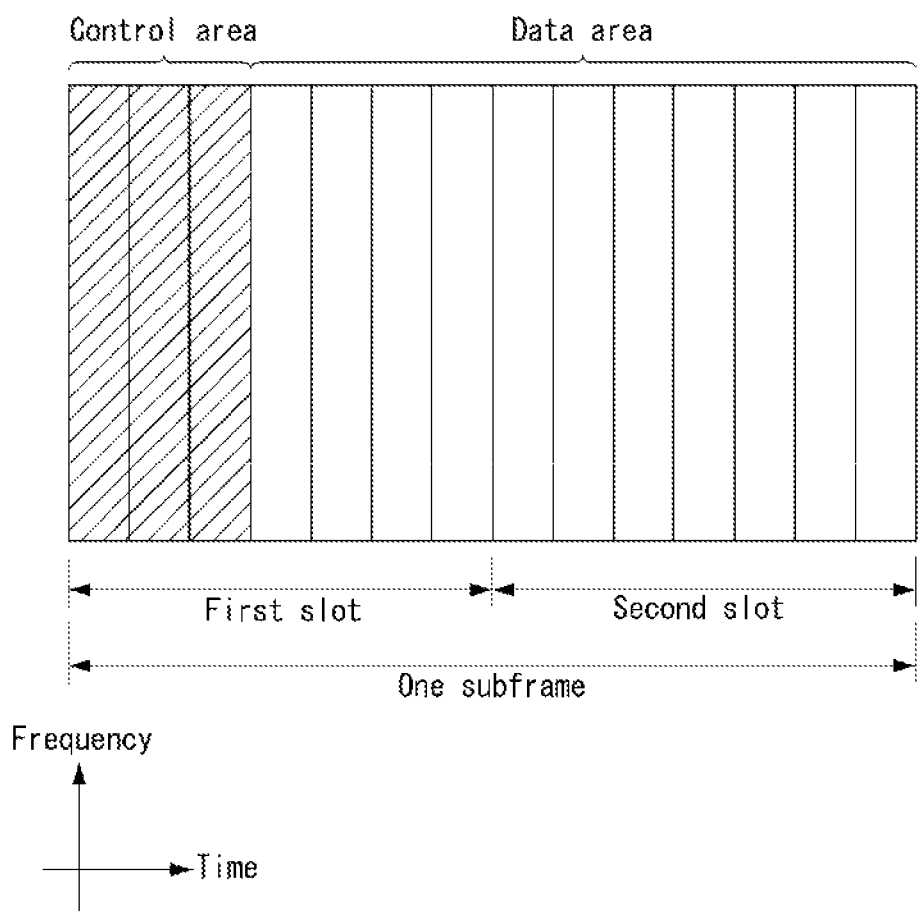

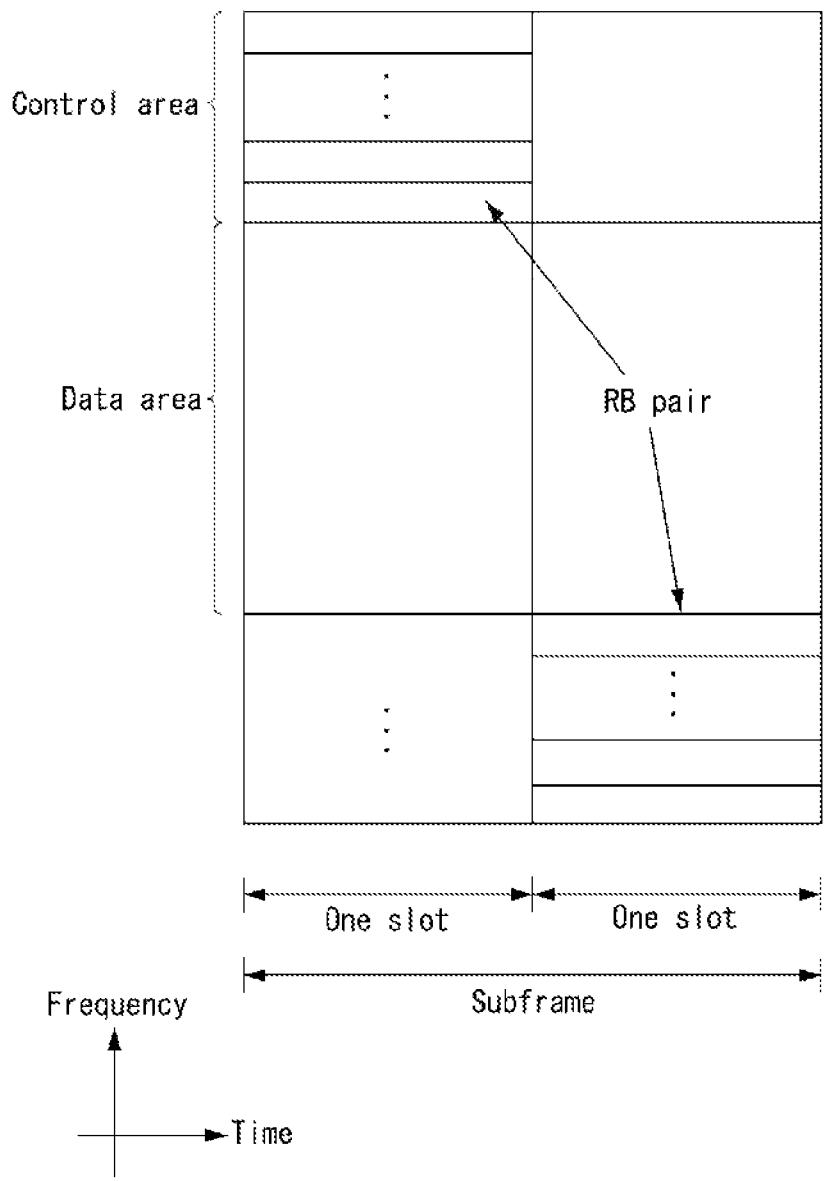
[Figure 4]

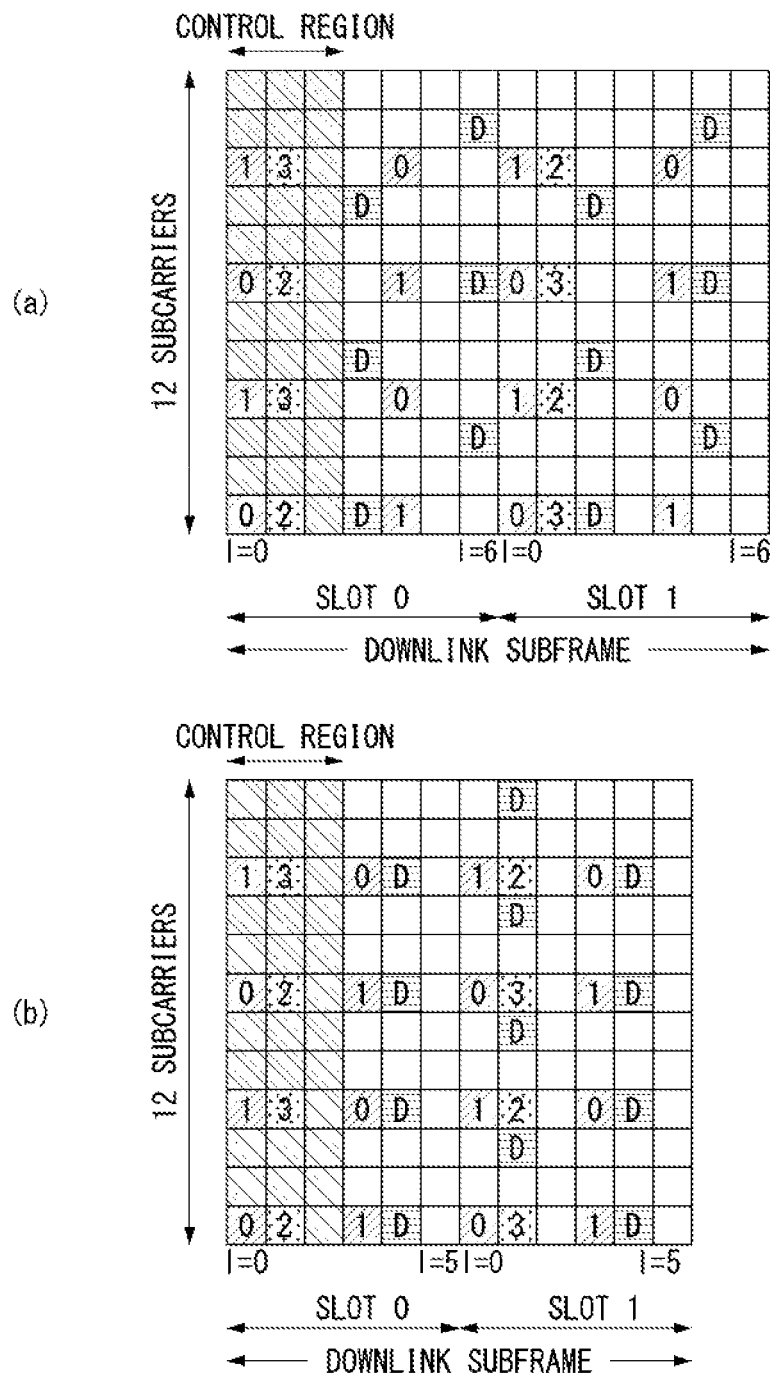
[Figure 5]

[Figure 6]
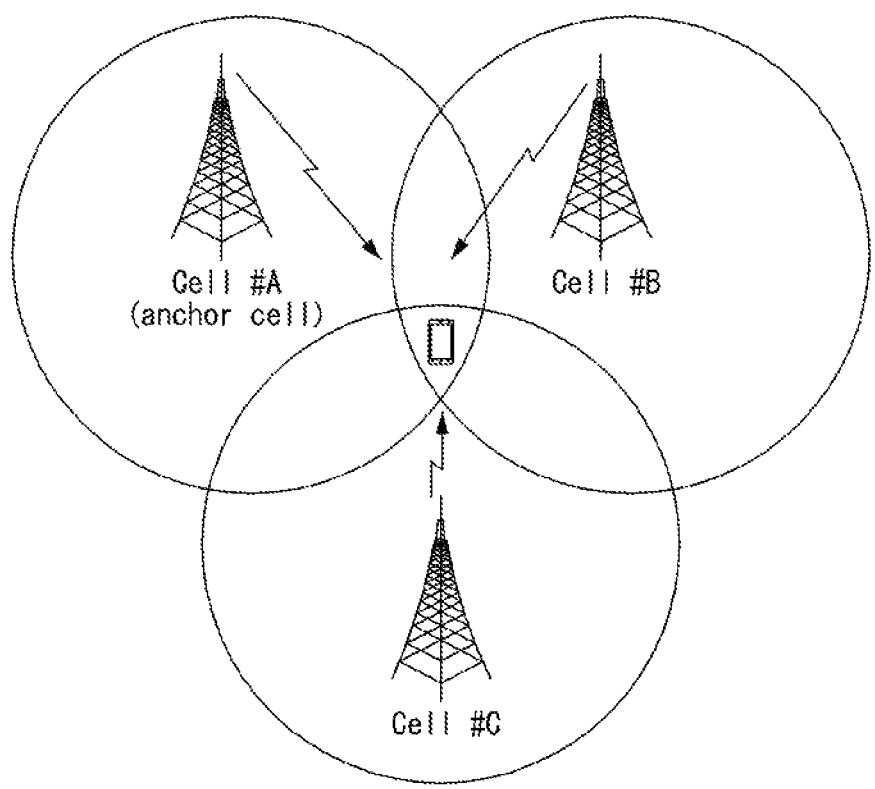

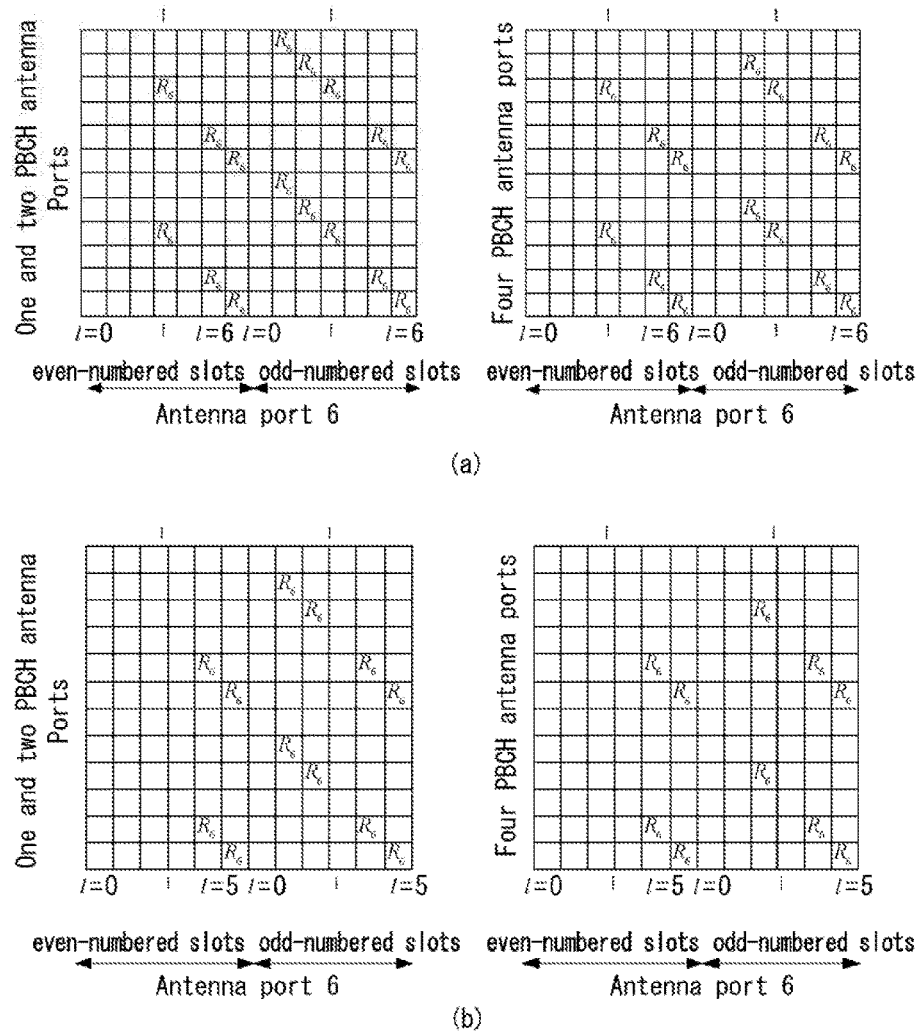
[Figure 7]

[Figure 8]
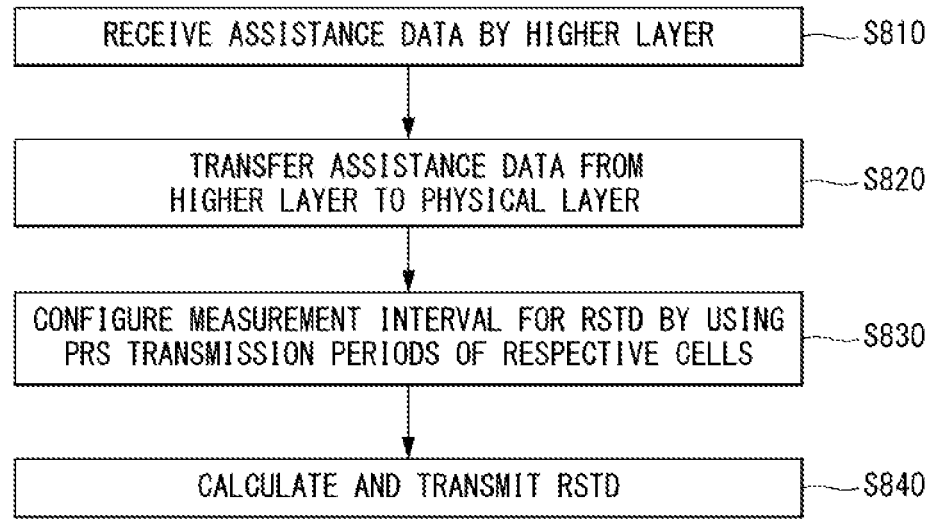
[Figure 9]
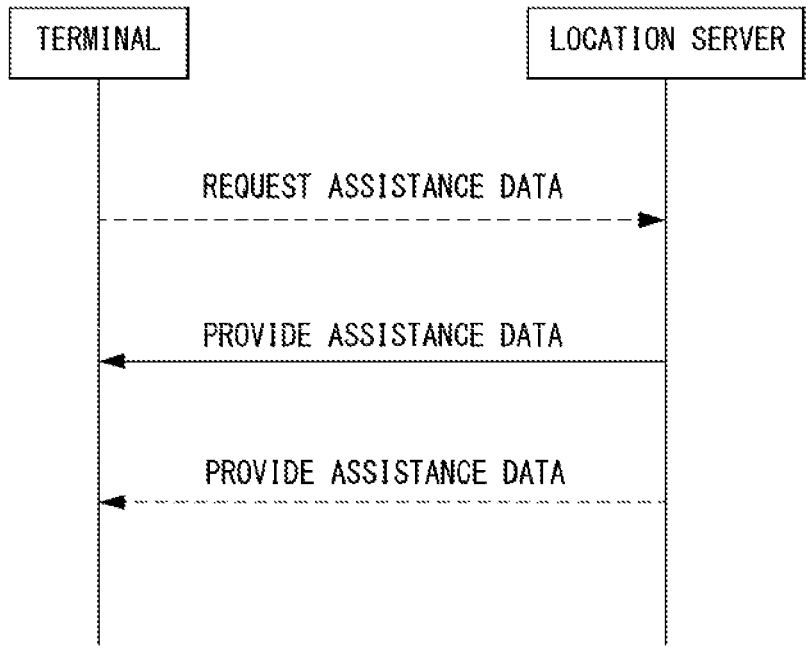

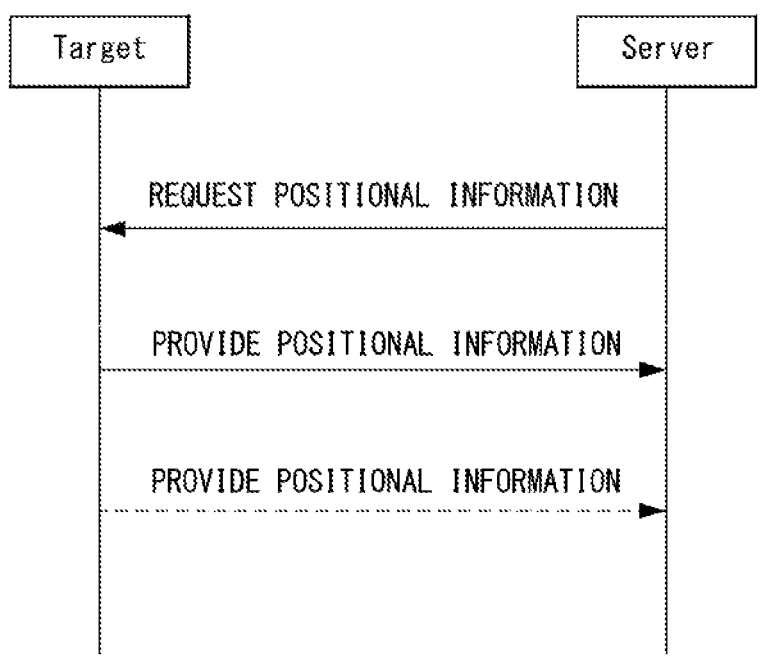
[Figure 10]

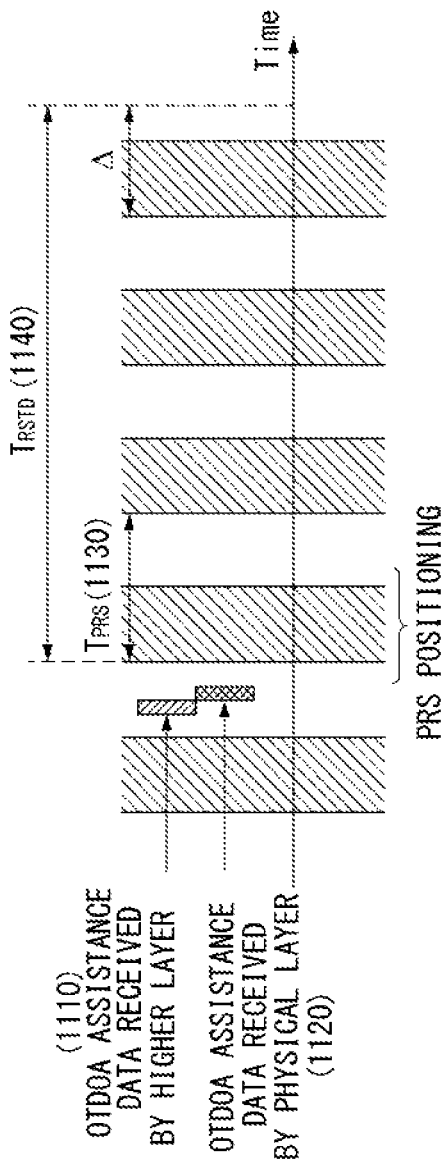

[Figure 12]
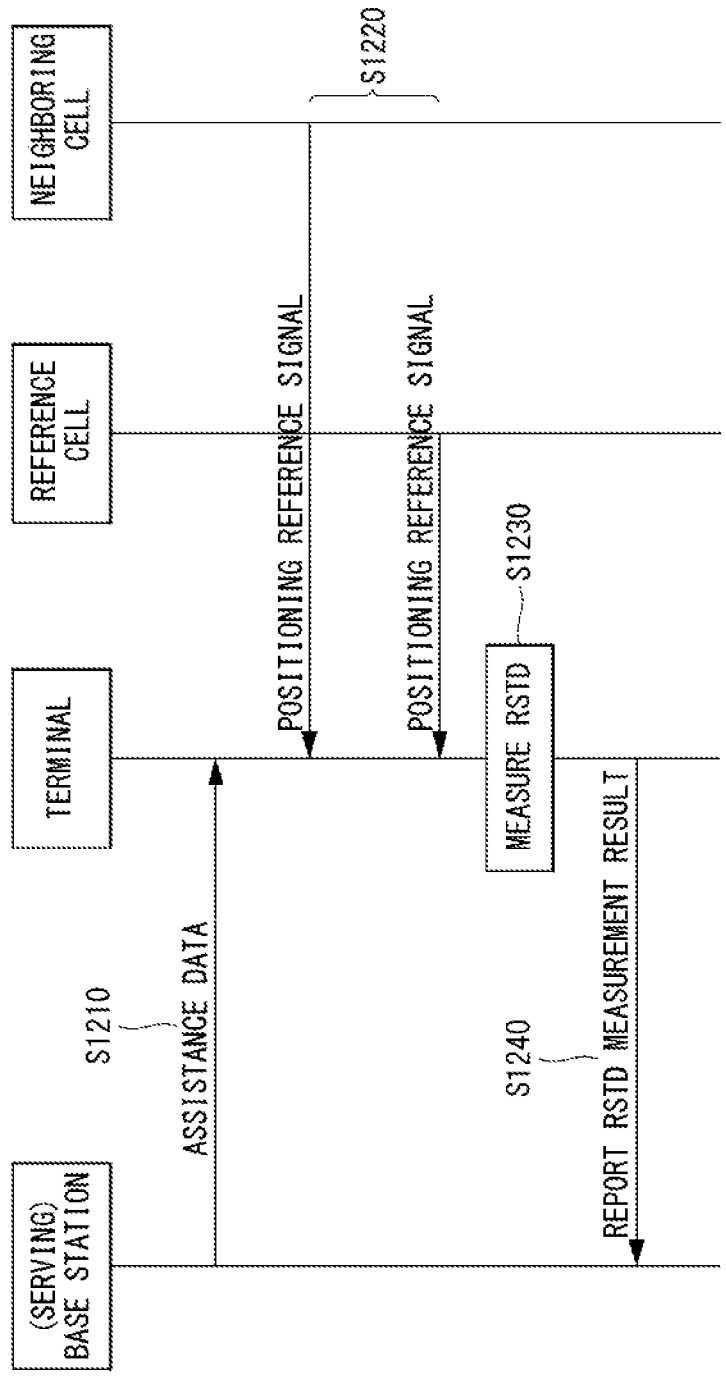

[Figure 13]
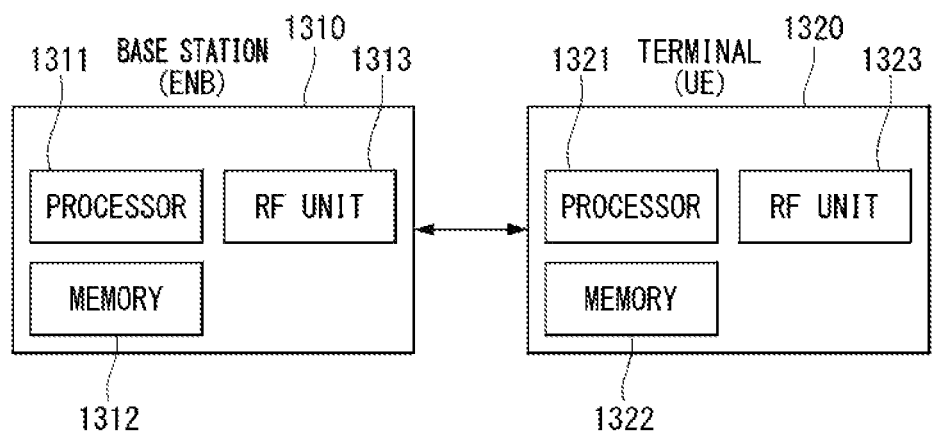

METHOD FOR PERFORMING POSITIONING IN WIRELESS COMMUNICATION SYSTEM, AND APPARATUS THEREFOR

CROSS REFERENCE TO RELATED APPLICATIONS

This application is the National Phase of PCT International Application No. PCT/KR2015/006294, filed on Jun. 22, 2015, which claims priority under 35 U.S.C. 119(e) to U.S. Provisional Application No. 62/016,087, filed on Jun. 23, 2014, all of which are hereby expressly incorporated by reference into the present application.

TECHNICAL FIELD

The present invention relates to a wireless communication system, and more particularly, to a method for performing positioning in the wireless communication system and an apparatus for supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An object of the present invention is to provide a method for hierarchically classifying and defining a positioning reference signal.

Another object of the present invention is to provide indication information for triggering a specific positioning reference signal as necessary.

Yet another object of the present invention is to provide a method for exchanging information through prior backhaul signaling between cells or nodes in order to use the positioning reference signal which is hierarchically classified and defined.

The technical objects of the present invention are not limited to the aforementioned technical objects, and other technical objects, which are not mentioned above, will be apparently appreciated by a person having ordinary skill in the art from the following description.

Technical Solution

The present invention provides a method for performing positioning by a terminal in a wireless communication system including: receiving assistance data including reference cell information (ReferenceCellInfo) and neighboring cell information (NeighbourCellInfo) from a serving base station; receiving a positioning reference signal from each of a reference cell and at least one neighboring cell based on the received assistance data; measuring a reference signal time difference (RSTD) for the reference cell and the at least one neighboring cell by using the received positioning reference signal; and reporting the measured RSTD to the serving base station.

Further, in the present invention, the first positioning reference signal may be transmitted with the long term or periodically and the second positioning reference signal may be transmitted with the short term, burstingly, or aperiodically.

In addition, in the present invention, the method may further include receiving control information associated with a cell that may transmit the second positioning reference signal from the serving base station.

Moreover, in the present invention, the control information may include at least one of a physical cell ID (PCI) of the cell that may transmit the second positioning reference signal, a scrambling ID, a transmission period of the second positioning reference signal, a transmission offset, and a transmission resource.

Besides, in the present invention, the method may further include receiving a control message including indication information indicating whether an operation associated with the second positioning reference signal is triggered from the serving base station, wherein the operation associated with the second positioning reference signal is measurement and reporting of the second positioning reference signal.

In addition, in the present invention, the control message may be downlink control information (DCI) or a MAC control element (CE).

Further, in the present invention, the control message may include S at least one of second positioning reference signal transmitting subframe information representing a subframe in which the second positioning reference signal is transmitted, identification information on neighboring cells that participate in transmitting the second positioning reference signal, a method and a report type of reporting a measurement result of the second positioning reference signal, time information associated with the measurement interval of the second positioning reference signal, and transmission band information of the second positioning reference signal.

Moreover, in the present invention, the time information associated with the measurement interval of the second positioning reference signal may be a start point or an end point of the measurement interval of the second positioning reference signal.

Further, in the present invention, the information included in the control message is shared through backhaul signaling before each cell transmits the second positioning reference signal to the terminal.

In addition, the second positioning reference signal transmitting subframe information may be expressed in a bitmap type.

Moreover, the present invention provides a terminal for performing positioning in a wireless communication system, including: a radio frequency (RF) unit for transmitting/receiving a wireless signal; and a processor functionally connected with the RF unit and controlling the terminal, wherein the processor controls receiving assistance data including reference cell information (ReferenceCellInfo) and neighboring cell information (NeighbourCellInfo) from a serving base station, receiving a positioning reference signal from each of a reference cell and at least one neighboring cell based on the received assistance data, measuring a reference signal time difference (RSTD) for the reference cell and the at least one neighboring cell by using the received positioning reference signal, and reporting the measured RSTD to the serving base station, the positioning reference signal is constituted by a first positioning reference signal and a second positioning reference signal, the first positioning reference signal is a cell-specific signal, and the second positioning reference signal is a UE-specific or UE group specific signal.

Advantageous Effects

According to the present invention, a positioning reference signal is hierarchically classified and used to more efficiently estimate a position of a terminal in a density area or an in-building environment.

Effects which can be obtained in the present invention are not limited to the aforementioned effects and other unmentioned effects will be clearly understood by those skilled in the art from the following description.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

FIG. 1 illustrates a structure of a radio frame in a wireless communication system to which the present invention can be applied.

FIG. 2 is a diagram illustrating a resource grid for one downlink slot in the wireless communication system to which the present invention can be applied.

FIG. 3 illustrates a structure of a downlink subframe in the wireless communication system to which the present invention can be applied.

FIG. 4 illustrates a structure of an uplink subframe in the wireless communication system to which the present invention can be applied.

FIG. 5 illustrates a reference signal pattern mapped to a downlink resource block pair in the wireless communication system to which the present invention can be applied.

FIG. 6 is a diagram illustrating an OTDOA method for positioning of a terminal.

FIG. 7 is a diagram illustrating a pattern in which a PRS is allocated to a resource element.

FIG. 8 is a flowchart illustrating one example of a positioning method of a terminal.

FIG. 9 is a diagram illustrating a process in which a terminal requests assistance data to a base station and receives the requested assistance data.

FIG. 10 is a diagram illustrating a process of transmitting positional information.

FIG. 11 is a diagram a process of transferring assistance data to a physical layer and configuring a measurement interval for an RSTD by using a PRS period.

FIG. 12 is a flowchart illustrating one example of a method for performing positioning proposed by the present invention.

FIG. 13 is a block diagram of a wireless communication apparatus according to an embodiment of the present invention.

BEST MODE

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 5 Illustrates a reference signal pattern mapped to a downlink resource block pair in the wireless communication system to which the present invention can be applied.

Referring to FIG. 5 as a unit in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 12a) and a length of 12 OFDM symbols in the case of an extended cyclic prefix (CP) (FIG. 12b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \qquad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ depends on the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

$$k = (k') \bmod N_{sc}^{RB} + N_{sc}^{RB} \cdot n_{PRB}$$ [Equation 2]
$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$
$$l = \begin{cases} 3 & l' = 0 \\ 6 & l' = 1 \\ 2 & l' = 2 \\ 5 & l' = 3 \end{cases}$$
$$l' = \begin{cases} 0, 1 & \text{if } n_s \bmod 2 = 0 \\ 2, 3 & \text{if } n_s \bmod 2 = 1 \end{cases}$$
$$m' = 0, 1, \ldots, 3N_{RB}^{PDSCH} - 1$$
$$v_{shift} = N_{ID}^{cell} \bmod 3$$

$$k = (k') \bmod N_{sc}^{RB} + N_{sc}^{RB} \cdot n_{PRB}$$ [Equation 3]
$$k' = \begin{cases} 3m' + v_{shift} & \text{if } l = 4 \\ 3m' + (2 + v_{shift}) \bmod 3 & \text{if } l = 1 \end{cases}$$
$$l = \begin{cases} 4 & l' \in \{0, 2\} \\ 1 & l' = 1 \end{cases}$$
$$l' = \begin{cases} 0 & \text{if } n_s \bmod 2 = 0 \\ 1, 2 & \text{if } n_s \bmod 2 = 1 \end{cases}$$
$$m' = 0, 1, \ldots, 4N_{RB}^{PDSCH} - 1$$
$$v_{shift} = N_{ID}^{cell} \bmod 3$$

In Equations 2 and 3, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ depends on the cell ID, the position of the reference signal has various frequency shift values according to the cell.

In an LTE-A system which is an evolved and developed form of an LTE system, a maximum of 8 transmitting antennas need to be designed to be supported to the downlink of the base station. Accordingly, RSs for a maximum of 8 transmitting antennas also need to be supported. In the LTE system, in the case of the downlink RS, since only RSs for a maximum of 4 antenna ports are defined, when the base station has 4 to a maximum of 8 downlink transmitting antennas in the LTE-A system, the RSs for the antennas ports need to be additionally defined and designed. In the case of a maximum of 8 transmitting antenna ports, both the RS for the above described channel measurement and the RS for data demodulation need to be designed.

One among important considerations in designing the LTE-A system backward compatibility, that is, that an LTE terminal needs to operate normally without unstudied ease even in the LTE-A system and the system also needs to support the backward compatibility. From an RS transmission viewpoint, in a time-frequency domain in which the CRS defined in the LTE is transmitted in a full band every subframe, the RSs for a maximum of 8 transmitting antennas need to be additionally defined. In the LTE-A system, when RS patterns for a maximum of 8 transmitting antennas are added to the full band every subframe by the method such as the CRS of the LTE in the related art, RS overhead is excessively increased.

Accordingly, newly designed RSs are largely divided into two categories in the LTE-A system and are RSs (CSI-RS, Channel State Information-RS, Channel State Indication-RS, and the like) for channel measurement for selection such as an MCS, a PMI, and the like and RSs (Data Demodulation-RS (DM-RS)) for demodulating data transmitted to 8 transmitting antennas.

The CSI-RS for the channel estimation is designed for is designed primarily for the channel measurement unlike a case where the CRS in the related art is used for measurement including the channel measurement, handover, and the like and the data demodulation. Of course, the CSI-RS may also be used even for the measurement including the handover, and the like. Since the CSI-RS is transmitted only for a purpose of acquiring information on a channel state, the CSI-RS may not be transmitted even subframe unlike the CRS. In order to reduce the overhead of the CSI-RS, the CSI-RS is intermittently transmitted on a time axis.

The DM RS is dedicatedly transmitted to the UE scheduled in the corresponding time-frequency domain for the data demodulation. That is, the DM-RS of specific UE is transmitted only to a region in which the corresponding UE is scheduled, that is, the time-frequency domain to receive data.

In the LTE-A system, the eNB needs to transmit the CSI-RSs for all antenna ports. Since the overhead is a too large disadvantage in that the CSI-RSs for a maximum of 8 transmitting antenna ports are transmitted every subframe, only the CSI-RS is not transmitted every subframe and is intermittently transmitted on the time axis, the overhead may be reduced. That is, the CSI-RS may be transmitted periodically at an integer-multiple period of one subframe or transmitted in a specific transmission pattern. In this case, the period or pattern in which the CSI-RS may be set by the eNB.

In order to measure the CSI-RS, the UE particularly needs to find information on a transmission subframe index of the CSI-RS for each CSI-RS antenna port to which the UE belongs, a CSI-RS resource element (RE) time-frequency position within a transmission subframe, and a CSI-RS sequence.

In the LTE-A system, the eNB needs to transmit the CSI-RSs with respect to a maximum of 8 antenna ports. Resources for transmitting the CSI-RS of different antenna ports need to be orthogonal to each other. One eNB maps the CSI-RSs for the respective antenna ports to different REs at the time of transmitting the CSI-RSs for the different antenna ports to orthogonally allocate the resources by an FDM/TDM method. Alternatively, the CSI-RSs for the different antenna ports may be transmitted by a CDM method in which the CSI-RSs are mapped to codes orthogonal to each other.

When the eNB announces information on the CSI-RS to the UE of the cell of eNB, the eNB first needs to announce information on a time-frequency to which the CSI-RS for each antenna port is mapped. In detail, the information is subframe numbers in which the CSI-RS is transmitted or the period in which the CSI-RS is transmitted and a subframe offset in which the CSI-RS is transmitted and includes an OFDM symbol number in which the CSI-RS RE of a specific antenna is transmitted, frequency spacing, an offset or shift value of the RE on a frequency axis, and the like.

Cell Measurement/Measurement Report

For one or several methods among several methods (handover, random access, cell search, and the like) for guaranteeing mobility of the UE, the UE reports a result of cell measurement to the base station (alternatively, the network).

In the 3GPP LTE/LTE-A system, the cell specific reference signal (CRS) is transmitted through 0, 4, 7, and 11-th OFDM symbols in each subframe on the time axis and the CRS is basically used. That is, the UE performs the cell measurement by using the CRS received from each of a serving cell and a neighbor cell.

The cell measurement is a concept including radio resource management (RPM) measurement of reference signal receive power (RSRP), a received signal strength indicator (RSSI), a reference signal received quality (RSRQ), and the like to measure signal strengths of the serving cell and the neighbor cell or a total received power to signal strength and radio link monitoring (RLM) measurement to evaluate a radio link failure by measuring a link quality with the serving cell.

The RSRP is a liner mean of power distribution of the RE in which the CRS is transmitted within a measurement frequency band. CRS(R0) corresponding to antenna port '0' may be used for determining the RSRP. Further, CRS(R1) corresponding to antenna port may be used for determining the RSRP. The number of REs in a measurement frequency band and a measurement interval used by the UE in order to determine the RSRP may be determined by the UE within a limit in which corresponding accuracy requirements are satisfied. Further, power per RE may be determined from energy received within a remaining part of a symbol except for a cyclic prefix (CP).

The RSSI is derived by the linear mean of total received power sensed from all sources by the corresponding UE, which include the serving cell and a non-serving cell of a co-channel, interference from an adjacent channel, thermal noise, and the like in OFDM symbols including the RS corresponding to antenna port '0' within the measurement band. When specific subframes for measuring the RSRQ are indicated by higher layer signaling, the RSSI is measured through all OFDM symbols within the indicated subframes.

The RSRQ is derived by xRSRP/RSSI. Herein, N represents the number of RBs in an RSSI measurement bandwidth. Further, in the above equation, a denominator and a numerator may be measured in the same set of RBs.

The base station may transfer configuration information for the measurement to the UE through the higher layer signaling (for example, an RRC connection reconfiguration message).

The RRC connection reconfiguration message includes a radio resource configuration dedicated ('radioResourceConfigDedicated') information element (IE) and a measurement configuration ('measConfig') IE.

The 'measConfig' IE specifies the measurement which needs to be performed by the UE and includes configuration information for intra-frequency mobility, inter-frequency mobility, and inter-RAT mobility as well as a configuration of a measurement gap.

In particular, the 'measConfig' IE includes 'measObjectToRemoveList' representing a list of a measurement object 'measObject' to be removed in the measurement and 'measObjectToAddModList' representing a list to be newly added or modified. Further, the 'measObject' includes 'MeasObjectCDMA2000', 'MeasObjctEUTRA', 'MeasObjectGERAN', and the like according to communication technology.

The 'RadioResourceConfigDedicated' IE is used for setting up/modifying/releasing a radio bearer, changing a semi-persistent scheduling configuration and changing a dedicated physical configuration.

The 'RadioResourceConfigDedicated' IE includes a 'measSubframePattern-Serv' field indicating a time domain measurement resource restriction pattern for serving cell measurement. Further, the 'RadioResourceConfigDedicated' IE includes 'measSubframeCellList' indicating the neighbor cell to be measured by the UE and 'measSubframePattern-Neigh' indicating the time domain measurement resource restriction pattern for neighbor cell measurement.

The time domain measurement resource restriction pattern configured for the measurement cell (including the serving cell and the neighbor cell) may indicate one subframe per radio frame for measuring the RSRQ. The RSRQ is not measured in subframes other than the subframe indicated by the time domain measurement resource restriction pattern configured for the measurement cell.

As such, the UE (for example, 3GPP Rel-10) needs to measure the RSRQ only in an interval configured by a subframe pattern 'measSubframePattern-Serv' for the serving cell measurement and a subframe pattern 'measSubframePattern-Neigh' for the neighbor cell measurement.

However, the measurement of the RSRP in the pattern is not restricted, but measuring the RSRP only within the pattern is preferable for the accuracy requirements.

Observed Time Difference of Arrival (OTDOA) Method

Hereinafter, the OTDOA method will be described in more detail.

FIG. 6 is a diagram illustrating an OTDOA method for positioning of a terminal.

Referring to FIG. 6, since the terminal performs a reference clock based on the subframe transmitted in the current serving cell, the signals received from the neighboring cells have different time of arrivals (TOA).

The serving cell and the neighboring cell may be expressed as a serving base station and a neighboring base station, respectively.

That is, in the OTDOA method, the terminal measures the position of the terminal by using a timing difference when the signals transmitted from the respective cells reach the terminal and since a reference cell is a cell which is a reference of a TDOA, a time required to receive the signal from one reference cell and a delay time of the signals received from a plurality of neighboring cells, respectively are measured by using a reference signal or a synchronization signal received from the plurality of neighboring cells to report the measured time and delay time to the serving cell or an anchor cell and the serving cell measures the position of the corresponding terminal by using the reported delay time.

Herein, the reference cell may mean a cell which may be a reference of the time difference of arrival (TDOA) and when the serving cell corresponds to the reference cell and the terminal performs the operations including the handover, and the like, the reference cell may correspond to the serving cell before the handover operation or the reference cell may not be changed regardless of the handover operation of the terminal, and the like.

As a measurement signal for positioning of the terminal, a common reference signal (CRS) or a primary synchronization signal/secondary synchronization signal (PSS/SSS) may be used, but a dedicated positioning reference signal (PRS) for a location service (LCS) may be used.

The positioning reference signal may be expressed as the positioning reference signal or a positioning pilot signal.

Hereinafter, the PRS will be described as an example as the measurement signal used for positioning of the terminal for easy description.

Positioning Reference Signal (PRS)

Next, the positioning reference signal (hereinafter, referred to as "PRS") will be described.

The PRS as the reference signal used for positioning of the terminal is transmitted only through resource blocks of the downlink subframe determined for transmitting the PRS.

A PRS sequence is defined by Equation 4.

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1$$
[Equation 4]

Where, $r_{l,n_s}(m)$ represents the PRS sequence, $n_s$ represents a slot number in a frame, and l represents an OFDM symbol number in a slot. c(i) represents a pseudo-random sequence and a pseudo-random sequence generator is initialized to $c_{init}$ shown in Equation 5 at a start point of each OFDM symbol.

$$c_{init} = 2^{10} \cdot (7 \cdot (n_s+1)+l+1) \cdot (2 \cdot N_{ID}^{cell}+1) + 2 \cdot N_{ID}^{cell} + N_{CP}$$ [Equation 5]

Where, $N_{ID}^{cell}$ represents a physical layer cell ID and $N_{CP}$ is 1 when the OFDM symbol a normal cyclic prefix (CP) and 0 when the OFDM symbol has an extended CP.

The PRS sequence $r_{l,n_s}(m)$ may be mapped to complex-valued modulation symbols $a_{k,l}^{(p)}$ used as the reference signal for antenna port 6 (p=6) in a slot $n_s$ configured for transmitting the reference signal according Equation 6.

$$a_{k,l}^{(p)} = r_{l,n_s}(m')$$ [Equation 6]

Where, a resource index pair (k, l) for transmitting the reference signal and m and m' values may be determined according to Equation 7 or 8 given below. Herein, Equation 7 shows the case of the normal cyclic prefix and Equation 8 shows the case of the extended cyclic prefix.

$$k = 6(m + N_{RB}^{DL} - N_{RB}^{PRS}) + (6 - l + v_{shift}) \bmod 6$$ [Equation 7]
$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 } PBCH \text{ antenna ports)} \\ 2, 3, 5, 6 & \text{if } n_s \bmod 2 = 1 \text{ and (4 } PBCH \text{ antenna ports)} \end{cases}$$
$$m = 0, 1, \ldots, 2 \cdot N_{RB}^{PRS} - 1$$
$$m' = m + N_{RB}^{max,DL} - N_{RB}^{PRS}$$

$$k = 6(m + N_{RB}^{DL} - N_{RB}^{PRS}) + (5 - l + v_{shift}) \bmod 6$$ [Equation 8]
$$l = \begin{cases} 4, 5 & \text{if } n_s \bmod 2 = 0 \\ 1, 2, 4, 5 & \text{if } n_s \bmod 2 = 1 \text{ and (1 or 2 } PBCH \text{ antenna ports)} \\ 2, 4, 5 & \text{if } n_s \bmod 2 = 1 \text{ and (4 } PBCH \text{ antenna ports)} \end{cases}$$
$$m = 0, 1, \ldots, 2 \cdot N_{RB}^{PRS} - 1$$
$$m' = m + N_{RB}^{max,DL} - N_{RB}^{PRS}$$

Herein, a bandwidth of the reference signal and the number $N_{RB}^{PRS}$ of resource blocks are configured by a higher layer. In addition, the reference signal has different frequency shift ($v_{shift}$) values for each cell and such a cell-specific frequency shift is determined according to Equation 9 given below.

$$v_{shift} = N_{ID}^{cell} \bmod 6$$ [Equation 9]

By such a method, when a preamble signal is mapped to the radio resource, a structure of a preamble transmitted in a specific subframe is shown in FIG. 7 to be described below.

FIG. 7 is a diagram illustrating a pattern in which a PRS is allocated to a resource element. FIG. 7(a) illustrates the case of the normal CP and FIG. 7(b) illustrates the case of the extended CP.

Positioning Method of Terminal

Net, the positioning method of the terminal will be described.

That is, according to the positioning method of the terminal using the PRS, the terminal receives assistance data from the serving base station and receives the PRS from the reference cell and the neighboring cells by using the assistance data, and calculate a reference signal time difference (hereinafter, referred to as "RSTD") between the reference cell and the neighboring cells and transmits the calculated reference signal time difference to the serving base station.

Thereafter, the serving base station transmits the RSTD to a location server and the location server determines the position of the terminal by using the RSTD.

The RSTD means a relative timing difference between the reference cell and the neighboring cell and is defined by Equation 10.

$$T_{subframeRxj} - T_{subframeRxi}$$ [Equation 10]

Where, $T_{subframeRxj}$ represents a time when the terminal receives the start point of one subframe from neighboring cell j and $T_{subframeRxi}$ represents a time when the terminal receives from the reference cell i the start point of one subframe closest to one subframe received from the cell j as reference cell i.

The reference cell and the neighboring cells may transmit the PRS at a similar time and when the reference cell and the neighboring cells transmit the PRS at the similar time, a difference between a time when the terminal receives the PRS from the reference cell and a time when the terminal receives the PRS from each of the plurality of neighboring cells are within a predetermined time range.

For example, a difference between the time between the time when the terminal receives the PRS from the reference cell and the time when the terminal receives the PRS from each of the plurality of neighboring cells may be within one subframe.

Then, in defining the RSTD, when one subframe in which the terminal receives from the neighboring cell j is a first subframe of PRS positioning occasions of the neighboring cell j, one subframe received from the cell i closet to one subframe received from the cell j becomes a first subframe of the PRS positioning occasions of the reference cell i.

In this case, the PRS positioning occasions mean consecutive downlink subframes to which the PRS is allocated. Accordingly, the RSTD becomes a difference between the time of receiving the PRS from the neighboring cell j and the time of receiving the PRS from the reference cell i.

In this case, the time of receiving the PRS from the specific cell is referred to as a time of arrival (hereinafter, referred to as "TOA") of the PRS.

The positioning method of the terminal using the PRS will be described in more detail with reference to FIG. 8.

FIG. 8 is a flowchart illustrating one example of a positioning method of a terminal.

As illustrated in FIG. 8, the higher layer of the terminal receives the assistance data from the location server (S810).

The assistance data may include information on the reference cell and/or at least one neighboring cell required for the terminal to calculate the RSTD.

Thereafter, when the higher layer of the terminal receives the assistance data, the higher layer of the terminal transfers to the assistance data to the physical layer (S820).

Thereafter, as indicated in the transferred assistance data, the physical layer of the terminal configures the measurement interval for the RSTD by using a PRS transmission period of each of the plurality of cells (S830).

When the measurement interval for the RSTD for each of the plurality of cells is configured by using the PRS transmission period, the terminal correspondingly calculates the RSTD and transmits or reports the calculated RSTD value to the location server (S840).

Hereinafter, each step for positioning of the terminal will be described in detail.

First, the step (S810) in which the terminal receives the assistance data in the higher layer is described.

The terminal may request the assistance data to the location server through the base station and receive the requested assistance data.

FIG. 9 is a diagram illustrating a process in which a terminal requests assistance data to a base station and receives the requested assistance data.

As illustrated in FIG. 9, the terminal transmits an assistance data request (RequestAssistanceData) message to the location server through the base station and the location server transmits an assistance data providing message (ProvideAssistanceData) message including the assistance data to the terminal.

Herein, the location server may transmit an additional assistance data providing message including additional assistance data to the terminal.

The assistance data providing message which the location transmits last includes an end transaction indicator indicating that the corresponding message is a last message.

Alternatively, the location server may transmit the assistance data providing message without a request of the terminal.

Meanwhile, the terminal (alternatively, a target device) and the location server may transmit positional information to each other. FIG. 10 is a diagram illustrating a process of transmitting positional information.

The location server transmits a positional information request (RequestLocationInformation) message to the terminal in order to request the positional information. In this case, a type of required positional information may be indicated or additional sub QoS may be indicated.

Thereafter, the terminal transmits a positional information providing (request (ProvidedLocationInformation) message to the location server in order to transmit the positional information.

The transmitted positional information needs to match positional information required in the previous step or be a subset when the server does not definitely permit additional positional information.

When the positional information is requested, the terminal transmits an additional positional information providing (request (ProvidedLocationInformation) message to the server in order to transmit the positional information.

The transmitted positional information needs to match the positional information required in the previous step or be the subset when the server does not definitely permit additional positional information.

The providing message which is transmitted last includes the end transaction indicator indicating that the corresponding message is the last message.

Next, the assistance data received by the terminal will be described in more detail.

Table 2 is a table showing OTDOA assistance data included in the assistance data providing message.

TABLE 2

-- ASN1START
OTDOA-ProvideAssistanceData ::= SEQUENCE {
    otdoa-ReferenceCellInfo              OTDOA-
                                                  ReferenceCellInfo
                OPTIONAL,  -- Need ON
    otdoa-NeighbourCellInfo             OTDOA-
NeighbourCellInfoList   OPTIONAL,  -- Need ON
    otdoa-Error                           OTDOA-Error
                              OPTIONAL,  -- Need ON
    ...
}
-- ASN1STOP As shown in Table 2, the OTDOA assistance data includes OTDOA reference cell information (otdoa-ReferenceCellInfo) and OTDOA neighboring cell information (otdoa-NeighbourCellInfo).

First, the OTDOA reference cell information (otdoa-ReferenceCellInfo) included in the OTDOA assistance data is described.

Table 3 is a table showing the OTDOA reference cell information.

TABLE 3

-- ASN1START
OTDOA-ReferenceCellInfo ::= SEQUENCE {
    physCellId                  INTEGER (0..503),
    cellGlobalId              ECGI
        OPTIONAL,      -- Need ON
    earfcnRef                 ARFCN-ValueEUTRA
        OPTIONAL,      -- Cond NotSameAsServ0
    antennaPortConfig      ENUMERATED    {ports1-or-2,
ports4, ... }
                        OPTIONAL,  --  Cond
NotSameAsServ1
    cpLength                   ENUMERATED { normal,
extended, ... }, TABLE 3-continued

```
    prsInfo                    PRS-Info
              OPTIONAL,        -- Cond PRS
    ...,
    [[ earfcnRef-v9a0          ARFCN-ValueEUTRA-v9a0
    OPTIONAL       -- Cond NotSameAsServ2
    ]]
}
-- ASN1STOP
```

The OTDOA reference cell information includes information on the reference cell.

As shown in Table 3, the OTDOA reference cell information includes a physical cell identity (physCellId), an antenna port configuration (antennaPortConfig), a cyclic prefix length (cpLength), and PRS information (prsInfo).

The physCellId represents the physical cell ID of the reference cell and the antennaPortConfig represents whether the reference cell uses at least one antenna port or 4 antenna ports for the cell-specific reference signal.

The cpLength means length information of the CP used at the time when the reference cell transmits the PRS. The prsInfo in information included in the OTDOA reference cell information (otdoa-ReferenceCellInfo) will be described in more detail with reference to Table 4.

Table 4 is a table showing the prsInfo.

TABLE 4

```
-- ASN1START
PRS-Info ::= SEQUENCE {
    prs-Bandwidth          ENUMERATED { n6, n15, n25, n50,
n75, n100, ... },
    prs-ConfigurationIndex INTEGER (0..4095),
    numDL-Frames           ENUMERATED {sf-1, sf-2, sf-4, sf-
6, ...},
    ...,
    prs-MutingInfo-r9      CHOICE {
        po2-r9                 BIT STRING (SIZE(2)),
        po4-r9                 BIT STRING (SIZE(4)),
```

TABLE 4-continued

```
        po8-r9                 BIT STRING (SIZE(8)),
        po16-r9                BIT       STRING
(SIZE(16)),
        ...
    }
                OPTIONAL            --
Need OP
}
-- ASN1STOP
```

As shown in Table 4, the prsInfo includes a PRS bandwidth (prs-Bandwidth), a PRS configuration index (prs-ConfigurationIndex), a downlink frame number (numDL-Frames), and PRS muting information (prs-MutingInfo).

The prs-Bandwidth represents the bandwidth used for configuring the PRS and the numDL-Frames represents the number (Nprs) of consecutive downlink subframes to which the PRS is allocated.

The prs-MutingInfo represents a PRS muting configuration of the corresponding cell. The PRS muting configuration is defined by a periodic PRS muting sequence having a period of TPRS and the TPRS is represented by the number of PRS positioning occasions. The positioning occasions include Nprs downlink subframes.

The PRS muting information may be defined based on a system frame number (SFN) of the serving cell or the reference cell. When the PRS muting information is defined based on the SFN of the serving cell, a first bit of the PRS muting sequence corresponds to a first positioning occasion which starts after the start point of a frame in which the system frame number (SFN) of the serving cell is 0 and when the PRS muting information is defined based on the SFN of the reference cell, the first bit of the PRS muting sequence corresponds to the first positioning occasion which starts after the start point of the frame in which the SFN of the serving cell is 0.

The prs-ConfigurationIndex represents the PRS configuration index. The PRS configuration index IPRS represents information on the time when the PRS is transmitted.

Next, the OTDOA neighboring cell information (otdoa-NeighbourCellInfo) included in the OTDOA assistance data will be described.

Table 5 is a table showing the OTDOA neighboring cell information.

TABLE 5

```
-- ASN1START
OTDOA-NeighbourCellInfoList ::= SEQUENCE (SIZE (1..maxFreqLayers)) OF
OTDOA-NeighbourFreqInfo
OTDOA-NeighbourFreqInfo  ::=   SEQUENCE  (SIZE   (1..24))  OF  OTDOA-
NeighbourCellInfoElement
OTDOA-NeighbourCellInfoElement ::= SEQUENCE {
        physCellId                                     INTEGER
(0..503),
        cellGlobalId                          ECGI
            OPTIONAL,                         -- Need ON
        earfcn                                ARFCN-
ValueEUTRA OPTIONAL,                          -- Cond NotSameAsRef0
        cpLength
            ENUMERATED {normal, extended, ...}
                                              OPTIONAL,  --  Cond
NotSameAsRef1
        prsInfo                                        PRS-Info
                        OPTIONAL,             -- Cond NotSameAsRef2
        antennaPortConfig                              ENUMERATED
{ports-1-or-2, ports-4, ...}
                                              OPTIONAL,  --  Cond
NotsameAsRef3
        slotNumberOffset                               INTEGER (0..19)
                OPTIONAL,                     -- Cond NotSameAsRef4
        prs-SubframeOffset                             INTEGER (0..1279)
            OPTIONAL,     -- Cond InterFreq
```

TABLE 5-continued

```
    expectedRSTD                          INTEGER
(0..16383),
    expectedRSTD-Uncertainty              INTEGER (0..1023),
    ...,
    [[ earfcn-v9a0                        ARFCN-ValueEUTRA-
v9a0    OPTIONAL      -- Cond NotSameAsRef5
    ]]
}
maxFreqLayers    INTEGER ::= 3
-- ASN1STOP
```

As shown in Table 5, the OTDOA neighboring cell information may include at least one OTDOA neighboring cell information element (OTDOANeighbourCellInfoElement) and a plurality of OTDOA neighboring cell information elements included in the OTDOA neighboring cell information may be arranged in a descending order of the neighboring cell with respect to the RSTD measurement of the terminal.

That is, a first OTDOA neighboring cell information element included in the OTDOA neighboring cell information may be an OTDOA neighboring cell information element of the neighboring cell having a highest priority with respect to the RSTD measurement of the terminal.

Each of the OTDOA neighboring cell elements includes the physical cell identity (physCellId), the cyclic prefix length (cpLength), the PRS information (prsInfo), the antenna port configuration (antennaPortConfig), a slot number offset (slotNumberOffset), a PRS subframe offset (prsSubframeOffset), an expected RSTD value (expectedRSTD), and uncertainty of the expected RSTD value (expectedRSTDUncertainty).

The physCellId represents the physical cell ID of the neighboring cell and the antennaPortConfig represents whether the neighboring cell uses one (alternatively, two) antenna ports or 3 antenna ports for the cell-specific reference signal.

The cpLength represents the length of the cyclic prefix of the PRS of the neighboring cell.

The prsInfo represents information on the PRS configuration of the neighboring cell. The prsInfo included in the OTDOA neighboring cell information element has the same form as the prsInfor included in the OTDOA reference cell information shown in Table 3. That is, the prsInfo includes the prs-Bandwidth, the prs-ConfigurationIndex, the numDL-Frames, and the prs-MutingInfo.

The prs-Bandwidth represents the bandwidth used for transmitting the PRS of the neighboring cell, the numDL-Frames represents the predetermined number (Nprs) of consecutive downlink subframe to which the PRS of the neighboring cell is allocated, the prs-MutingInfo represents the PRS muting configuration of the neighboring cell, and the prs-ConfigurationIndex represents the PRS configuration index of the neighboring cell.

The slotNumberOffset represents the slot number offset of the reference cell and the neighboring cell. The slot number offset means an offset from the start point of a specific radio frame of the reference cell up to the start point of the radio frame of the neighboring cell which appears first after the specific radio frame. The slot number offset may be expressed by the number of slots and when the slot timing of the neighboring cell is the same as that of the reference cell, the slotNumberOffset field may be omitted.

The prs-SubframeOffset represents offsets of a specific first PRS subframe of the reference cell at a reference carrier frequency and a first PRS subframe of a PRS burst of the neighboring cell, which appears first after the first PRS subframe at another carrier frequency and is expressed by the number of subframes.

The expectedRSTD is an RSTD value which the terminal is expected to measure. When Ts is 1/(15000*2048) seconds, a resolution of the expectedRSTD is 3 Ts.

The expectedRSTD-Uncertainty represents uncertainty of the expectedRSTD value. That is, the expectedRSTDUncertainty represents an error range of the expectedRSTD value. The uncertainty of the expectedRSTD value is associated with estimation of the position of the terminal by the location server. The expectedRSTD-Uncertainty defines a search window of the terminal shown in Equation 11 and the resolution of the expectedRSTD-Uncertainty is 3 Ts.

[expectedRSTD−expectedRSTD$_{Uncertainty}$<
measuredRSTD<expectedRSTD+expectedRST-
D$_{Uncertainty}$]  [Equation 11]

Referring back to the description of the step for positioning of the terminal, when the higher layer of the terminal receives the assistance data from the location server, the higher layer transfers the assistance data to the physical layer (S820) and the physical layer configures the measurement interval for the RSTD by using the PRS transmission period of each of the plurality of cells as indicated by the transferred assistance data (S830).

In this regard, a method for determining the PRS transmission period according to the PRS configuration index included in the prsInfo will be described.

Table 6 shows the PRS transmission period (TPRS) and the PRS subframe offset Δ PRS depending on the PRS configuration index.

TABLE 6

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | Reserved | |

The physical layer receives the PRS configuration index from the higher layer. The PRS is transmitted only in the configured subframe and transmitted in NPRS consecutive downlink subframes. The NPRS is also configured in the higher layer. The first subframe among NPRS consecutive subframes in which the PRS is transmitted is a subframe satisfying Equation 12.

$$\left(10 \times n_f + \left\lfloor \frac{n_s}{2} \right\rfloor - \Delta_{PRS}\right) \mod T_{PRS} = 0 \qquad \text{[Equation 12]}$$

Where, $n_f$ represents the SFN and $n_s$ represents the slot number.

That is, when the terminal receives the assistance data providing message, the terminal may find each PRS information by using the PRS configuration index of at least one cell included in the assistance data providing message.

Next, a method in which the terminal configures the measurement interval $T_{RSTD}$ for the RSTD by using the PRS transmission period in order to receive the signal from the base station and perform the measurement will be described.

When physical cell IDs of the neighboring cells and the OTDOA sub data are simultaneously provided, the terminal may receive the RSTD and perform the measurement. In the frequency band, n including the reference cell is at least 16 cells and the reference cell satisfies a condition within $T_{RSTD}$ ms given below.

$$T_{RSTD}=T_{TRS}\cdot(M-1)+\Delta_{ms})\quad\quad\quad\text{[Equation 13]}$$

Where, $T_{RSTD}$ represents a total time required for search and measurement in at least n cells. $T_{TRS}$ represents a cell-specific location frame configuration period. M represents the number of PRS positioning occasions and $\Delta_{ms}$ as a measurement time for one PRS positioning occasion includes a sampling time and a processing time.

Table 7 shows organization of contents associated with M which is the number of positioning occasions.

TABLE 7

| Positioning subframe configuration period $T_{PRS}$ | Number of PRS positioning occasions M | |
|---|---|---|
| | f2 Note1 | f1 and f2 Note2 |
| 160 ms | 16 | 32 |
| >160 ms | 8 | 16 |

Note1:
When inter-frequency RSTD measurements are performed over the reference cell and neighbour cells, which belong to the FDD inter-frequency carrier frequency f2.
Note2:
When inter-frequency RSTD measurements are performed over the reference cell and the neighbour cells, which belong to the serving FDD carrier frequency f1 and the FDD inter-frequency carrier frequency f2 respectively.

When $T_{RSTD}$ is determined, the terminal may transmit the RSTD measured within $T_{RSTD}$ (S840). In this case, measured information is preferably transmitted after a $T_{RSTD}$ period elapsed in order to guarantee certainty. However, even before the $T_{RSTD}$ period elapsed, when the measured information satisfies a predetermined signal strength condition, and the like, information associated with the RSTD may be transmitted.

FIG. 11 is a diagram a process of transferring assistance data to a physical layer and configuring a measurement interval for an RSTD by using a PRS period.

Referring to FIG. 11, when the assistance data is received by the higher layer (1110), the physical layer receives the received assistance data (1120) and $T_{TRS}$ is determined as indicated by the assistance data (1130) and $T_{RSTD}$ is determined according to the determined $T_{TRS}$ (1140).

Accordingly, the PRS received from each cell is measured based on each $T_{RSTD}$ and the POA is calculated to report the RSTD value to the location server.

Meanwhile, RSTD measurement accuracy of the terminal for all measurement neighboring cells i needs to satisfy the following requirements. Hereinafter, the described requirements assume that the measurement report is not delayed by other LTE positioning protocol (LPP) through a dedicated control channel (DCCH).

In the case of an RSTD measurement reporting delay, delay uncertainty which occurs when the measurement report is inserted into a TTI of an uplink DCCH is not considered. Herein, the delay uncertainty is equal to 2×TTI-DCCH. Further, the measurement report delay does not include even any delay which may be caused because there is no uplink resource when the terminal transmits the measurement report.

The RSTD means the relative timing difference between the reference cell and the neighboring cell and is defined as shown in Equation 8 given below.

Table 8 is a table for describing the reference signal time difference (RSTD).

TABLE 8

| Definition | The RSTD means the relative timing difference between the neighbour cell j and the reference cell i, defined as $T_{SubframeRxj} - T_{SubframeRxi}$, where: $T_{SubframeRxj}$ is the time when the UE receives the start of one subframe from cell j and $T_{SubframeRxi}$ is the time when the UE receives the corresponding start of one subframe from cell i that is closest in time to the subframe received from cell j. The reference point for the observed subframe time difference shall be the antenna connector of the UE. |
|---|---|
| Application | RRC_CONNECTED intra-frequency RRC_CONNECTED inter-frequency |

As described above, the reference cell and the neighboring cells may transmit the PRS at a similar time and when the reference cell and the neighboring cells transmit the PRS at the similar time, a difference between a time when the terminal receives the PRS from the reference cell and a time when the terminal receives the PRS from each of the plurality of neighboring cells are within a predetermined time range.

For example, the time between the time when the terminal receives the PRS from the reference cell and the time when the terminal receives the PRS from each of the plurality of neighboring cells may be within one subframe. Then, in defining the RSTD, when one subframe in which the terminal receives from the neighboring cell j is a first subframe of PRS positioning occasions of the neighboring cell j, one subframe received from the cell i closet to one subframe received from the cell j becomes a first subframe of the PRS positioning occasions of the reference cell i.

In this case, the PRS positioning occasions mean consecutive downlink subframes to which the PRS is allocated.

Accordingly, the RSTD becomes a difference between the time of receiving the PRS from the neighboring cell j and the time of receiving the PRS from the reference cell i.

Hereinafter, a method for estimating the position of the terminal by defining a new type of reference signal (RS) or pilot signal proposed by the present specification will be described in detail.

A name of the base station used below may be called remote radio head (RRH), the eNB, a transmission point (TP), a reception point (RP), a relay, and the like.

In general, in a cellular communication system, various methods are used in order for the network to acquire the positional information of the terminal.

Representatively, in the LTE(-A) system, the position of the terminal is estimated through the observed time difference of arrival (OTDOA) method using the positioning reference signal (PRS).

The positioning reference signal (PRS) may be called the positioning reference signal.

In detail, the terminal is configured with the PRS transmission configuration information associated with the PRS transmission from the higher layer signal and calculates information on the position of the terminal through a positioning technique such as the OTDOA, and the like by measuring the PRSs transmitted by the neighboring cells and transfers the calculated information to the network.

As other positioning methods of the terminal, various methods including an assisted global navigation satellite system (A-GNSS) positioning technique, enhanced cell-ID (E-CID) techniques, an uplink time difference of Arrival (UTDOA), and the like are provided.

The positional information of the terminal measured by the positioning method may be used for various location-based services (e.g., advertisement, position tracking, emergency communication means, and the like).

As described above, the positioning methods in the related art have already been supported by 3GPP UTRA and E-UTRA standards (e.g., LTE Rel-9), but in recent years, an enhanced positioning technique having higher accuracy has been required, in particular, with respect to in-building positioning.

That is, even though the positioning methods in the related art are technologies which may be commonly applied to an outdoor/indoor environment, the normal positioning accuracy is known, for example, as approximately 150 m in an NLOS environment and approximately 50 m in an LoS environment in the case of an E-CID method.

Further, the OTDOA method based on the PRS also has a limit that a positioning error may be more than 100 m due to a synchronization error of the base station, an error by multipath propagation, an RSTD measurement quantization error of the UE, a timing offset estimation error, and the like.

Further, in the case of the A-GNSS method, since a GNSS receiver is required, since the A-GNSS has a limit in complexity and batter consumption, there is a limit in using the A-GNSS method in the in-building positioning.

Accordingly, the present specification basically provides a method in which a cellular network transmits a specific pilot signal (alternatively, a specific RS) to the terminal, and the terminal calculates a positioning related estimation value through a specific positioning technique by measuring the received specific pilot signal and reports the calculated estimation value to the base station to calculate the positional information of the terminal in the network.

The specific pilot signal or specific RS which represents a new position estimation related reference signal may be a reference signal type which may be identified for each station or transmission point (TP).

A positioning related estimation value by the specific positioning technique may be an estimation value through the OTDOA method, the RSTD method, and the like as one example.

Hereinafter, the specific pilot signal will be referred to as an 'enhanced PRS (E-PRS)' for easy description.

That is, as the 'E-PRS', the PRS in the related art may be partially reused as shown in Table 6 given above and a separate RS may be designed and applied regardless of the PRS in the related art.

The positioning method of the terminal using the E-PRS proposed by the present specification represents UE-specific or UE-group-specific (E-PRS) transmission and a report method of the UE-specific or UE-group-specific (E-PRS) transmission by the terminal.

A minimum transmission period of the PRS in the related art is 160 ms as shown in Table 6 given above, and the PRS transmission in the related art is cell-specific, while the transmission of the E-PRS proposed by the present specification intermittently, concentratively, and aperiodically occurs.

That is, the E-PRS may be used only with respect to specific UE or a specific UE set of which intermittent, concentrative, and aperiodic positioning are required and a positioning related operation (E-PRS measurement and reporting by the terminal) may be triggered only to the corresponding terminal or terminal group.

The triggering of the positioning related operation of the terminal using the 'E-PRS' may be performed through a specific DCI format or a new DCI format as one example. Detailed contents associated therewith will be described below.

That is, in the positioning method of the terminal using the newly defined E-PRS, the base station or TPs may transmit the E-PRS to the terminal with a short period during a very short-term interval and the terminal may measure and report the E-PRS.

In particular, in the case of the in-building positioning, a lot of small base stations (e.g., small cells) may be installed in a building.

In this case, there may be a limit in performing the in-building positioning by using only a long-term cell-specific PRS having a reuse coefficient 6 (by PCI mod 6) in the related art by a spatial characteristic in the building.

Accordingly, the RS transmission which is burst throughout the short-term interval is performed only with respect to the terminal (alternatively, the terminal group) of which the corresponding measurement operation is required in order to improve the measurement accuracy of the terminal to be effective to control a network overhead problem by the RS transmission.

E-PRS Type

The E-PRS used for positioning of the terminal proposed by the present specification may have two or more E-PRS hierarchical structures having different levels.

That is, the E-PRS proposed by the present specification may be divided into a first E-PRS and a second E-PRS.

Herein, the first E-PRS may be an RS type transmitted with a long term and/or periodically.

Expression of A and/or means A, B, or at least one of A and B.

The first E-PRS may be a structure that reuses at least one of the elements including the period, the offset, the PRS sequence generating method in the related art, the transmission resource position, and the like shown in Table 6 given above.

That is, the first E-PRS may mean a type such as the PRS in the related art.

When the terminal receives the first E-PRS from the base station, the terminal performs measurement the relative long-term or periodic E-PRS and RSTD reporting like the positioning mechanism in the related art, and as a result, the network may periodically obtain relative coarse positional information of the terminal.

Herein, configuration (alternatively, transmission) of the first E-PRS may be optional.

That is, in order to more stably continue the location based service of the terminal, continuously obtaining the coarse location information through the configuration of the first E-PRS may be preferable, but according to the application, the process of the first E-PRS may be omitted and only a second E-PRS configuration type to be described below may be operated.

The first E-PRS and the second E-PRS may be simultaneously configured and operated, of course.

On the contrary, the second E-PRS may be a relative short-term, bursty, and/or aperiodic RS.

Herein, prior information on the base station or TP which may transmit the second E-PRS to the terminal may be provided in a list type in advance.

The prior information may include at least one of a physical cell ID (PID) of the corresponding base station or TP, a specific scrambling ID, a transmission (available) period of the second E-PRS, the offset, and the transmission resource position as one example.

Some information of list information for the base station or TP which may transmit the second E-PRS provided to the terminal in advance may be common with the information on the first E-PRS.

The some information may be a transmittable resource position, a scrambling ID, and the like as one example.

E-PRS Related Operation Triggering Method

Hereinafter, the E-PRS related operation triggering method of the terminal will be described.

The E-PRS related operation triggering method of the terminal represents a method that activates (alternatively, turns on) or deactivates (alternatively, turns off) the measurement and reporting operations of the second E-PRS by the terminal.

That is, the terminal may be indicated to perform or not to perform the measurement and reporting operations of the second E-PRS described above based on specific dynamic indication information such as the DCI format or an MAC control element (CE).

For example, the dynamic indication information indicating the activation or deactivation of the measurement and reporting operations of the second E-PRS may be transmitted from the base station to the terminal through the DCI format.

The DCI format may be format 1A, 1B, 1C, 1D, 2, 2A, 2B, 2C, 2D, or a new DCI format as one example.

That is, when the dynamic indication information is transmitted through the DCI format, a new field indicating the activation or deactivation (of the measurement and reporting operations) of the second E-PRS is added to the DCI format or a specific field in the related art is reanalyzed to provide the dynamic indication information to the terminal.

For example, when the measurement and reporting operations of the second E-PRS are triggered by the corresponding field (the field in the DCI format), the terminal may analyze that resource allocation (RA) field information which is present in the DCI format indicates an RB region in which the second E-PRS is transmitted and the terminal may measure the second E-PRS within the band indicated by the RA field.

Further, when the second E-PRS is designed to be transmitted in a data region in which the PDSCH may be transmitted in a type illustrated in FIG. 7a or 7b similarly to the PRS in the related art, the terminal may recognize that the PDSCH is not scheduled but the measurement and reporting operations of the second E-PRS start at the time of receiving the DCI format.

Herein, a rate matching condition that the PDSCH is not mapped to the REs in which the second E-PRS is transmitted may be additionally (separately) granted.

Herein, when the second E-PRS related operation triggering is indicated through the RA field, remaining fields other than the RA field, that is, other fields (e.g., MCS, RV, NDI, DMRSconfig, TPMI related information, and the like) which are present for the PDSCH scheduling become unrequired information, the triggering may be reused for the purpose of transferring information required for the measurement/reporting operation of the second E-PRS to the unrequired information field.

One example of the information required for the measurement/reporting operation of the second E-PRS may include second E-PRS transmission subframe information (e.g., may be a specific subframe bitmap type), identification information (e.g., not the PCI list itself but some scrambling element information (e.g., an nSCID type or separately added new parameter) for generating a sequence of the E-PRS transmitted by each base station or TP) regarding neighboring cells which participate in transmitting the second E-PRS during the transmission interval of the second E-PRS, a specific reporting method of a measurement result of the terminal, a type indicator indicating a specific report type, and the like.

When the dynamic indication information indicating the activation or deactivation of the measurement and reporting operations of the second E-PRS is transmitted through the new DCI format, the DCI format constituted by the required information may be designed without the process of reanalyzing the field in the related art.

As another example, even the case where the activation or deactivation of the measurement and reporting operations of the second E-PRS is triggered to a MAC layer (e.g., MAC CE) may be defined or configured similarly to the case where the activation or deactivation of the measurement and reporting operations of the second E-PRS is triggered by using the DCI format described above.

Herein, similarly in the case where the measurement and reporting operations of the second E-PRS are triggered to the MAC CE, the information associated with the measurement and reporting operations of the second E-PRS is included in a MAC message format to be transmitted to the terminal.

Further, end time information of a time interval in which the terminal measures the second E-PRS may also be explicitly defined, configured, or indicated.

For example, in the DCI based second E-PRS dynamic triggering method, transmission subframe information (e.g., a specific L-bit subframe bitmap type) of the second E-PRS, that is, additional information indicating that L second E-PRS transmission subframes are repeated with M cycles may be provided while being included in the DCI format.

In this case, the terminal may recognize that a measurement interval for the second E-PRS is configured throughout a total of L*M subframes.

It is apparent that the additional information may be similarly provided even to the MAC CE described above.

Alternatively, information (a measurement start point, measurement duration, a measurement end point, and the like) associated with the measurement interval for the second PRS may be explicitly indicated through a different from a serving-cell timing, that is, an offset value based on the serving-cell timing of the corresponding terminal (e.g., SFN, subframe indexing, and the like).

Further, as the transmittable position (in detail, the transmittable RE position of the RS per PRS pair) of the second E-PRS, the type illustrated in FIG. 7a or 7b may be just reused.

However, the transmission resource position of the second E-PRS is not limited to the position of the PRS transmittable RE in the related art and may be applied through various RS designs, of course.

This as one example considers a case where the type such as the PRS sequence in the related art is just used for both transmission of the first E-PRS and transmission of the second E-PRS proposed by the present specification.

As described above, in the E-PRS transmissions proposed by the present specification, the RS is burstingly transmitted aperiodically except for the PRS transmittable period in the related art to enable the terminal to additionally perform the positioning measurement and reporting.

Backhaul Signaling Information Exchange Between Base Station or TPs

Hereinafter, a method that shares the E-PRS related information proposed by the present specification through backhaul signaling between the base station or the TPs will be described.

The base station, the TP, the node, the cell, and the like used by the present specification as main agents that transmit the E-PRS proposed by the present specification to the terminal may be construed as the same meaning.

Each term may be used according to the E-PRS transmitting agent defined in a specific network.

As described above, measurement of the second E-PRS transmitted to the terminal with the short term, burstingly, or aperiodically starts by dynamic triggering. Herein, the dynamic triggering may be indicated through the DCI or MAC CE.

For smooth operation of the measurement and reporting operations of the second E-PRS, ideal synchronization and ideal backhaul (e.g., an optical fiber) need to be maximally guaranteed at the network side.

That is, a backhaul link is formed between a distributed antenna system or a small cell through an optical cable, and the like, and as a result, in an environment in which there is no backhaul delay or an occurrence probability of the backhaul delay is very low, the base station or the TPs that will transmit the second E-PRS needs to already make a preparation before triggering the second E-PRS proposed by the present specification to a specific terminal.

Therefore, in a non-ideal backhaul environment, in order for the base station or the TPs to cooperatively normally perform the measurement and reporting operations of the second E-PRS to the terminal, the backhaul signaling (e.g., X2-signaling) needs to be defined between the base station and the TP in order to support the operation.

That is, as one example of the backhaul signaling between the base station and the TPs proposed by the present specification, the signaling elements may be supported.

Among multiple nodes, cells, and TPs in a specific network, by operating & management (O&M) or a pre-defined pattern, or separate backhaul signaling (e.g., X2), when each node, cell, and TP transmits the second E-PRS to the terminal, prior information associated with which configuration of scrambling ID(s), the period, the offset, and a resource position candidate set needs to be previously promised the second E-PRS may be transmitted according to and to this end, the backhaul signaling, and the like may be defined between the base station and the TPs.

In detail, when a specific sender node transmits at least one of backhaul signaling information elements corresponding to clauses (1) to (4) given below to a receiver node(s), all cells/TPs which belong to the corresponding receiver nodes transmit the second PRS to the terminal in a predetermined transmission interval (every subframe proposed from the start time from the end point) according to a second PRS transmitting method defined in advance or indicated by information of clauses (1) to (4) given below.

Herein, the receiver nodes transmit the information of clauses (1) to (4) received from the sender node to the cells/TPs which belong thereto.

Herein, the sender node and the receiver node may mean a specific cell, a specific base station, or a specific TP and be a concept of an object including multiple cells, base stations, or TPs.

(1) A cell-ID (alternatively, TP-ID) which needs to transit the second PRS and scrambling ID related information of the corresponding cell/TP. In addition, when there are different sequence generation methods by a separate sequence pattern or an additional parameter value for each cell/TP, the corresponding additional parameter value (2) Information on a substrate that needs to transmit the second PRS for each cell/TP.

As one example, the subframe in which each cell/TP transmits the second PRS may be explicitly indicated in an L-bit subframe bit map type.

Alternatively, the second PRS transmitting subframes may be distinguished and indicated for each specific cell/TP group by a method in which the second PRS transmitting subframes are distinguished in odd and even subframe index types based on the serving-cell timing or distinguished through a modulo operation.

(3) Transmission band related information to allow the second PRS to be transmitted (for each cell/TP). For example, the transmission band related information may be represented by an RB index set or a resource allocation field format on the DCI format.

(4) Information on the start point and/or the end point of the second PRS transmission interval commonly for the receiver node(s). The corresponding information may be explicitly signaled.

A reference time may be defined or configured so that the sender and receiver nodes find an absolute point of time each other or pre-defined between the nodes by separate signaling, and the like.

That is, the information such as the subframe bitmap for each cell/TP of clause (2) described above may be applied into the common second PRS transmission interval.

Therefore, the receiver node that receives the backhaul signaling information of clauses (1) to (4) from a specific sender node may define or configure obligatorily starting the second PRS transmission of each cell/TP controlled thereby according to the information of clauses (1) to (4).

Further, the receiver node may feed back a response (accept or reject) message to the received backhaul signaling information to the sender node.

Further, the receiver node may feed back a specific status report including whether all of the respective cells/TPs complete the second PRS transmission, a resource rate at which data scheduling is abandoned for each cell/TP due to the second PRS transmission, and the like after the second PRS transmission interval ends together with the response message.

The sender node may refer to the feedback information at the time of transmitting the next backhaul signaling information to the receiver node.

As described above, as the 1-way signaling type, a method that allows the receiver node to obligatorily follow the backhaul signaling information may be more effectively used in a specific centralized network architecture by pre-defining that the receiver nodes obligatorily follows the backhaul signaling information only when the specific sender node transmits the backhaul signaling information by the Q&M, and the like.

Before the backhaul signaling transmission/reception, first, when a terminal requiring a positioning procedure by the second PRS transmission is generated in the cell/TP controlled by the individual nodes (e.g., a request may be made from the terminal for each specific service application), the individual nodes may first transmit a specific invoke message to the node (the sender node) that controls other cell/TP that needs to transmit the second PRS transmission (alternatively, to a specific central control node).

Thereafter, the node(s) that receive(s) the invoke message transmit(s) a response thereto and a protocol order in which the backhaul signaling is exchanged so that the cells/TPs accept transmitting the second PRS share the information of clauses (10 to 94) may be defined.

E-PRS Sequence Generation Method

Hereinafter, the E-PRS sequence generation method proposed by the present specification will be described in detail.

The PRS sequence generation in the related art is calculated by scrambling initialization of Equation 14 given below.

$$c_{init}=2^{10} \cdot (7 \cdot (n_s+1)+l+1) \cdot (2 \cdot N_{ID}^{cell}+1)+2 \cdot N_{ID}^{cell}+N_{CP}$$ [Equation 14]

As described above, like the distributed antenna system or CoMP scenario, when an environment in which multiple TPs transmit the CRS generated with the same PCI ($N_{ID}^{cell}$ in Equation 14), and the like are considered, the PRS (alternatively, E-PRS) sequence initialization proposed through the present specification may be changed as shown in Equation 15 given below in order to announce separate PRS sequence generation and transmission from each TP to the terminal.

$$c_{init}=2^{10} \cdot (7 \cdot (n_s+1)+l+1) \cdot (2 \cdot N_{ID}^{TP}+1)+2 \cdot N_{ID}^{TP}+N_{CP}$$ [Equation 5]

Equation 15 is applied by receiving a separate scrambling parameter for each PRS sequence generation distinguished from an actual PCI of the corresponding terminal from the higher layer by changing an equation to with a parameter configured from the higher layer like a separate $N_{ID}^{TP}$ parameter instead of the $N_{ID}^{cell}$ parameter in Equation 14.

Additionally, in the RSTD definition described above, a part corresponding to 'reference cell i' may also be continuously defined or configured to be applied based on not the serving-cell of the terminal but the PRS generated with a specific $N_{ID}^{TP}$ value indicated by a higher layer signal.

In addition, each neighbor cell j is recognized to measure the PRS generated with the corresponding $N_{ID}^{TP}$ value.

All positioning related operations (based on $N_{ID}^{cell}$) indicated for each cell in the related art may be substituted with $N_{ID}^{TP}$ according to the same principle.

As a result, the RSTD definition may be defined as shown in Table 9 given below.

TABLE 9

| RSTD Definition | The relative timing difference between the neighbour cell j and the reference cell i, defined as $T_{SubframeRxj} - T_{SubframeRxi}$, where: $T_{SubframeRxj}$ is the time when the UE receives the start of one subframe from cell j $T_{SubframeRxi}$ is the time when the UE receives the corresponding start of one subframe from cell i that is closest in time to the subframe received from cell j. The reference point for the observed subframe time difference shall be the antenna connector of the UE. |
|---|---|

Through such a process, when multiple TPs having the same PCI transmit separate PRSs (alternatively, E-PRSs), respectively, the terminal may definitely recognize that each PRS sequence is generated in a separate TP-ID type regardless of the PCI of the actual serving cell of the terminal.

FIG. 12 is a flowchart illustrating one example of a positioning method of a terminal proposed by the present invention.

As illustrated in FIG. 12, the terminal operates through the following steps for positioning, that is, measuring the position of the terminal in the wireless communication system.

First, the terminal receives assistance data including reference cell information (ReferenceCellInfo) and neighboring cell information (NeighbourCellInfo) from a serving base station (S1210).

Herein, the serving base station may be expressed as the serving cell and the serving cell may mean a cell in which the terminal may obtain the system frame number (SF N).

The aforementioned contents are referred for detailed description of the reference cell information, the neighboring cell information, and the assistance data.

Thereafter, the terminal receives a positioning reference signal from each of the reference cell and at least one neighboring cell based on the received assistance data (S1220).

The positioning reference signal may be constituted by a first positioning reference signal and a second positioning reference signal.

Further, the first positioning reference signal may be a cell-specific signal and the second positioning reference signal may be a UE-specific or UE group specific signal.

Further, the first positioning reference signal may be transmitted with the long term or periodically and the second positioning reference signal may be transmitted with the short term, burstingly, or aperiodically.

Thereafter, the terminal measures the reference signal time difference (RSTD) for the reference cell and the at least one neighboring cell by using the received positioning reference signal (S1230).

A detailed procedure of measuring the RSTD will be described below.

First, the terminal measures each of the time of arrival (TOA) of the positioning reference signal of the reference cell and the TOA of the positioning reference signal of at least one neighboring cell.

In addition, the terminal calculates the RSTD for the reference cell and the at least one neighboring cell by using the TOA of the positioning reference signal of the reference cell and the TOA of the positioning reference signal of at least one neighboring cell.

Thereafter, the terminal reports the measured RSTD to the serving base station (S1240).

Additionally, the terminal may further receive control information associated with the cell that may transmit the second positioning reference signal from the serving base station.

The step of receiving the control information may be preferably performed earlier than step S1210.

The control information may include at least one of a physical cell ID (PCI) of the cell that may transmit the second positioning reference signal, the scrambling ID, the transmission period of the second positioning reference signal, the transmission offset, and the transmission resource.

Further, the terminal may further receive a control message including indication information indicating whether an operation associated with the second positioning reference signal is triggered from the serving base station.

Herein, the operation associated with the second positioning reference signal may mean measurement and reporting of the second positioning reference signal.

The control message may be the downlink control information or the MAC control element (CE), but is not limited thereto and may mean various messages in which the methods proposed by the present specification may be implemented.

In addition, the control message may include at least one of second positioning reference signal transmitting subframe information representing the subframe in which the second positioning reference signal is transmitted, identification information on neighboring cells that participate in transmitting the second positioning reference signal, a method and a report type of reporting a measurement result of the second positioning reference signal, time information associated with the measurement interval of the second positioning reference signal, and transmission band information of the second positioning reference signal.

Herein, the time information associated with the measurement interval of the second positioning reference signal may mean the start point or the end point of the measurement interval of the second positioning reference signal.

Further, the information included in the control message is shared through the backhaul signaling before each cell transmits the second positioning reference signal to the terminal.

General Apparatus to which Present Invention can be Applied

FIG. 13 is a block diagram of a wireless communication apparatus according to an embodiment of the present invention.

Referring to FIG. 13, the wireless communication system includes a base station 1310 and multiple terminals 1320 positioned in a region of the base station 1310.

The base station 1310 includes a processor 1311, a memory 1312, and a radio frequency (RF) unit 1313. The processor 1311 implements a function, a process, and/or a method which are proposed in FIGS. 1 to 12 given above. The layers of the radio interface protocol may be implemented by the processor 1311. The memory 1312 is connected with the processor 1311 to store various pieces of information for driving the processor 1311. The RF unit 1313 is connected with the processor 1311 to transmit and/or receive a radio signal.

A terminal 1320 includes a processor 1321, a memory 1322, and an RF unit 1323. The processor 1321 implements a function, a process, and/or a method which are proposed in FIGS. 1 to 12 given above. The layers of the radio interface protocol may be implemented by the processor 1321. The memory 1322 is connected with the processor 1321 to store various pieces of information for driving the processor 1321. The RF unit 1323 is connected with the processor 1321 to transmit and/or receive a radio signal.

The memories 1312 and 1322 may be positioned inside or outside the processors 1311 and 1321 and connected with the processors 1311 and 1321 through various well-known means.

Further, when the base station 1310 and/or the terminal 1320 may have one antenna or multiple antennas.

The aforementioned embodiments are acquired by combining the components and features of the present invention in a predetermined format. It should be considered that each component or feature is selective if not additionally clearly mentioned. Each component or feature may be implemented while being not combined with other components or features. Further, some components and/or features are combined to configure the embodiment of the present invention. A sequence of the operations described in the embodiments of the present invention may be changed. Some components or features of any embodiment may be included in another embodiment or replaced with corresponding components or features of another embodiment. It is apparent that claims having no clear quoting relation in the claims are combined to configure the embodiment or may be included as new claims by correction after application.

The embodiments of the present invention may be implemented by various means, for example, hardware, firmware, software, or combinations thereof. In the case of the implementation by the hardware, methods according to exemplary embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

When the embodiments are implemented by the firmware or the software, the embodiments of the present invention may be implemented in the form of a module, a procedure, a function, and the like to perform the functions or operations described above. A software code may be stored in the memory and executed by the processor. The memory may be positioned inside or outside the processor and send and receive data to and from the processor by various means which is already known.

It is apparent to those skilled in the art that the present invention may be implemented in another specific form within the scope without departing from the essential feature of the present invention. Therefore, the detailed description should not limitedly be analyzed in all aspects and should be exemplarily considered. The scope of the present invention should be determined by rational interpretation of the appended claims and all changes are included in the scope of the present invention within the equivalent scope of the present invention.

INDUSTRIAL APPLICABILITY

In the wireless communication system, the example in which the positioning method is applied to the 3GPP LTE/LTE-A system is primarily described, but the proximate based notification method can be applied to various wireless communication systems in addition to the 3GPP LTE/LTE-A system.

The invention claimed is:

1. A method for performing, by a user equipment (UE), positioning in a wireless communication system, the method comprising:
receiving, from a serving base station, assistance data including reference cell information (ReferenceCellInfo) and neighboring cell information (NeighbourCellInfo);
receiving, from the serving base station, a control message including indication information including whether an operation related with a second positioning reference signal is triggered;
receiving a positioning reference signal from each of a reference cell and at least one neighboring cell based on the received assistance data;
measuring a reference signal time difference (RSTD) for the reference cell and the at least one neighboring cell by using the received positioning reference signal; and
reporting the measured RSTD to the serving base station,
wherein the positioning reference signal comprises at least one of a first positioning reference signal or the second positioning reference signal,
wherein the first positioning reference signal is a cell-specific signal, wherein the second positioning reference signal is a UE-specific signal or a UE group specific signal, wherein the second positioning reference signal is transmitted based on the indication information included in the control message, wherein the control message further includes a start point or an end point of a measurement interval of the second positioning reference signal, wherein the first positioning reference signal is transmitted with a long term or periodically, and wherein the second positioning reference signal is transmitted with a short term, burstingly, or aperiodically.

2. The method of claim 1, further comprising:
receiving, from the serving base station, control information related with a cell that transmits the second positioning reference signal.

3. The method of claim 2, wherein the control information includes at least one of a physical cell identity (PCI) of the cell that transmits the second positioning reference signal, a scrambling identity, a transmission period of the second positioning reference signal, a transmission offset, or a transmission resource.

4. The method of claim 1,
wherein the operation related with the second positioning reference signal is measurement and reporting of the second positioning reference signal.

5. The method of claim 1, wherein the control message is downlink control information (DCI) or a medium access control (MAC) control element (CE).

6. The method of claim 1, wherein the control message further includes at least one of second positioning reference signal transmitting subframe information representing a subframe in which the second positioning reference signal is transmitted, identification information on neighboring cells that participate in transmitting the second positioning reference signal, a method and a report type of reporting a measurement result of the second positioning reference signal or transmission band information of the second positioning reference signal.

7. The method of claim 6, wherein the information included in the control message is shared through backhaul signaling before each cell transmits the second positioning reference signal to the UE.

8. The method of claim 6, wherein the second positioning reference signal transmitting subframe information is expressed in a bitmap type.

9. A user equipment (UE) for performing positioning in a wireless communication system, the UE comprising:
a transceiver configured to transmit and receive a wireless signal; and
a processor functionally connected with the transceiver,
wherein the processor is configured to:
control the transceiver to receive, from a serving base station, assistance data including reference cell information (ReferenceCellInfo) and neighboring cell information (NeighbourCellInfo),
control the transceiver to receive, from the serving base station, a control message including indication information including whether an operation related with a second positioning reference signal is triggered,
control the transceiver to receive a positioning reference signal from each of a reference cell and at least one neighboring cell based on the received assistance data,
measure a reference signal time difference (RSTD) for the reference cell and the at least one neighboring cell by using the received positioning reference signal, and
report the measured RSTD to the serving base station,
wherein the positioning reference signal comprises at least one of a first positioning reference signal or the second positioning reference signal,
wherein the first positioning reference signal is a cell-specific signal,
wherein the second positioning reference signal is a UE-specific signal or a UE group specific signal,
wherein the second positioning reference signal is transmitted based on the indication information included in the control message,
wherein the control message further includes a start point or an end point of the measurement interval of the second positioning reference signal,
wherein the first positioning reference signal is transmitted with a long term or periodically, and
wherein the second positioning reference signal is transmitted with a short term, burstingly, or aperiodically.

* * * * *